(12) United States Patent
Hawkes

(10) Patent No.: US 12,514,616 B2
(45) Date of Patent: Jan. 6, 2026

(54) PRESSON PEDICLE SCREW VARIATIONS

(71) Applicant: Nexus Spine, LLC, Salt Lake City, UT (US)

(72) Inventor: David Hawkes, Pleasant Grove, UT (US)

(73) Assignee: Nexus Spine, LLC, Salt Lake City, UT (US)

( * ) Notice: Subject to any disclaimer, the term of this patent is extended or adjusted under 35 U.S.C. 154(b) by 296 days.

(21) Appl. No.: 14/854,029

(22) Filed: Sep. 14, 2015

(65) Prior Publication Data

US 2016/0074074 A1 Mar. 17, 2016

Related U.S. Application Data

(60) Provisional application No. 62/050,013, filed on Sep. 12, 2014, provisional application No. 62/050,002, filed on Sep. 12, 2014.

(51) Int. Cl.
*A61B 17/70* (2006.01)

(52) U.S. Cl.
CPC ...... *A61B 17/7007* (2013.01); *A61B 17/7005* (2013.01)

(58) Field of Classification Search
CPC ............ A61B 17/7005; A61B 17/7007; A61B 17/7037; A61B 17/7038; A61B 2017/00477
USPC .................................. 606/253, 257, 265, 266
See application file for complete search history.

(56) References Cited

U.S. PATENT DOCUMENTS

| | | | | |
|---|---|---|---|---|
| 6,022,350 | A * | 2/2000 | Ganem | A61B 17/7059 606/272 |
| 7,678,136 | B2 * | 3/2010 | Doubler | A61B 17/7007 606/246 |
| 9,232,965 | B2 * | 1/2016 | Hawkes | A61B 17/7007 |
| 9,247,974 | B2 * | 2/2016 | Tornier | A61B 17/8605 |
| 2004/0181223 | A1 * | 9/2004 | Ritland | A61B 17/7007 606/258 |
| 2005/0192571 | A1 * | 9/2005 | Abdelgany | A61B 17/7037 411/427 |
| 2008/0071273 | A1 * | 3/2008 | Hawkes | A61B 17/7007 606/279 |

(Continued)

*Primary Examiner* — Pedro Philogene
*Assistant Examiner* — David C Comstock
(74) *Attorney, Agent, or Firm* — Bryant J. Keller; Kirton McConkie

(57) ABSTRACT

Variations on improved pedicle screw coupling assemblies, along with methods for use of such assemblies provide improved functional characteristics over existing devices. A coupling assembly is capable of providing rigid fixed attachment between a pedicle screw fully seated to underlying bone and a member extending between adjacent pedicle screws. The coupling assembly includes a pedicle screw having a threaded shaft and a head portion. The head portion includes a driving feature and a proximally oriented bore having a bore diameter. In one version, the coupling assembly includes a member adapted to extend between adjacent pedicle screws. The member includes a protrusion adapted for insertion into the bore of the pedicle screw, the protrusion having a protrusion diameter that is larger than the bore of the pedicle screw head portion. In another version, the coupling assembly includes a spherical bore in the screw head.

20 Claims, 17 Drawing Sheets

(56) References Cited

U.S. PATENT DOCUMENTS

2008/0140075 A1\* 6/2008 Ensign ............... A61B 17/7007
606/60

\* cited by examiner

PRESSON PEDICLE SCREW VARIATIONS

CROSS-REFERENCE TO RELATED APPLICATIONS

This application claims the benefit of U.S. Provisional Application No. 62/050,002, filed Sep. 12, 2014, and U.S. Provisional Application No. 62/050,013, filed Sep. 12, 2014.

BACKGROUND OF THE INVENTION

1. Field of the Invention

The present invention relates to coupling systems for use in surgical implants, and more particularly to coupling systems for use with orthopedic rod systems.

2. Background and Related Art

Bone stabilization/fixation devices to align or position bones have been used for some time. Such devices have been used to align or position specific vertebrae, or a specific region of the spine. Typically, such devices utilize a coupling assembly to connect or link two or more surgical screws and/or pedicle screws together to stabilize the bone and/or joint around which the screws are fixed. Conventional coupling assemblies are typically comprised of a relatively rigid member, such as a plate or a rod, that is used to couple or join adjacent structures or parts of the anatomy. Once the coupled structures are spatially fixed in position, surgical procedures can be completed and healing can proceed.

Such conventional surgical and/or pedicle screw coupling systems have several drawbacks. For example, such systems are rather large and bulky, which can result in increased tissue damage in and around the surgical site, resulting both from installation of the coupling system during surgery and from implant induced, post-operative tissue irritation and erosion. The relative bulk of prior art devices can be particularly troublesome in supra-fascial applications.

Some prior art coupling systems have a rod-receiving device that is delivered to the surgeon already coupled or attached to the head of the surgical screw, which poses two challenges: 1) this prevents certain surgical maneuvers (e.g. placing the screws prior to interbody work); and, 2) increases the carrying cost of the inventory. Furthermore, traditional coupling systems do not allow for varying the rod stiffness along a multi-segmented construct; certain indications may require a stiff rod over one segment and a flexible rod over another.

Further, traditional systems inherently possess an inability to easily extend a fusion: e.g., in a revision procedure, the existing rod would need to be either completely removed and replaced with a new rod or cut in vivo. In addition, some of the prior art coupling systems include locking components (e.g., set screws and the like) that must all be carefully assembled together during the surgical procedure. Further, many traditional surgical screw system designs complicate or even preclude the ability to be placed percutaneously over a guide wire, which makes these systems more difficult to install and maneuver during surgical procedures, including minimally invasive procedures.

Furthermore, many prior art devices require that the rod be attached to the coupling device after the screw is inserted in the bone, which can be disadvantageous at times, whereas the option to assemble the rod to the coupling device outside the wound may prove valuable. Also, existing coupling systems often necessitate simultaneous locking of all components, which prevents the ability to properly compress a coupling system along the rod because the angle relative to the surgical screw would change.

Furthermore, predicate technology necessitates bending of the rod for multi-segmented constructs. Rod bending is not only cumbersome to perform, but invariably results in an unintended stress applied to the bones.

Efforts have been made to address the concerns discussed above. For example, U.S. Patent Application Publication No. 2008/0140075 to Ensign and Hawkes discloses a pedicle screw and tulip assembly that reduces complexity by coupling a tulip assembly to a pedicle screw via an interference fit. As another example, U.S. Patent Application Publication No. 2010/0217334 to Hawkes discloses a coupling assembly that receives a pedicle screw via an interference fit and that provides an interference fit to another coupling assembly. U.S. Pat. No. 8,894,687 to Hakwes, Gardner, and Halverson discloses additional extensions of the concepts disclosed in the other patent publications. Each of these referenced patent publications are incorporated herein by reference in their entireties. Nevertheless and notwithstanding the advancements disclosed in these publications, certain difficulties remain to be addressed.

BRIEF SUMMARY OF THE INVENTION

According to implementations of the invention, variations on improved pedicle screw coupling assemblies are provided, along with methods for use of such assemblies. According to certain implementations of the invention, a coupling assembly is capable of providing rigid fixed attachment between a pedicle screw fully seated to underlying bone and a member extending between adjacent pedicle screws. The coupling assembly includes a pedicle screw having a threaded shaft and a head portion. The head portion includes a driving feature and a proximally oriented bore having a bore diameter. The coupling assembly also includes a member adapted to extend between adjacent pedicle screws. The member includes a protrusion adapted for insertion into the bore of the pedicle screw, the protrusion having a protrusion diameter that is larger than the bore of the pedicle screw head portion.

The bore may be cylindrical, and the protrusion may include a partially spherical surface. Insertion of the protrusion into the bore may be made possible by an application of force that forces a point of maximum diameter of the protrusion fully within the bore. Full insertion of the protrusion may cause a distal surface of the protrusion to contact a distal portion of the bore.

The bore may be adapted to receive the protrusion at a variety of insertion angles. For example, the bore may be adapted to receive the protrusion at any angle between an axis of symmetry of the screw and an axis of symmetry of the protrusion of up to thirty degrees.

The member may also include an anvil opposite the protrusion. The anvil may have a partially spherical surface adapted to receive an insertion force to force the protrusion into the bore. The head portion may include an annular ridge on an outer surface of the head portion. The annular ridge may assist in the development of force between the head portion and the member. When the protrusion is received within the proximally oriented bore, a press fit is created between the protrusion and the head portion.

According to alternative implementations of the invention, a coupling assembly is capable of providing rigid fixed attachment between a pedicle screw fully seated to underlying bone and a member extending between adjacent pedicle screws. The coupling assembly includes a pedicle screw having a threaded shaft and a head portion. The head portion includes a driving feature, an external bore-engaging surface defining an external diameter of the head portion, and a proximally oriented screw bore having a proximal portion with a first, narrower diameter and a medial portion with a second, broader diameter. The coupling assembly also includes a member adapted to extend between adjacent pedicle screws. The member includes a female member having a receiving bore adapted to receive the head portion of the pedicle screw therein, the receiving bore having an inner diameter that is smaller than the external diameter of the pedicle screw head portion.

The external bore-engaging surface may be partially spherical. The proximally oriented screw bore may define a partially spherical surface, and the diameter of the proximal portion smaller than a diameter of the partially spherical surface. The receiving bore may be cylindrical.

The female member may include an access bore extending through the female member from a terminal end of the receiving bore. The screw bore may be adapted to receive an engaging tip of a tool adapted to apply an engaging force between the head portion and the female member. When the head portion of the pedicle screw is disposed within the receiving bore, a press fit is created between the head portion and the receiving bore. The coupling assembly may include a partially spherical tip disposed within the proximally oriented screw bore, as well as an expansion pin disposed within the partially spherical tip.

The features as described herein may allow the surgeon to insert the pedicle screw fully until it is fully seated against the bone while still being able to apply force between the pedicle screw and the member extending between pedicle screws so as to fixedly attach the member to the pedicle screw or screws via a press fit. Prior devices have not been able to provide this capability.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
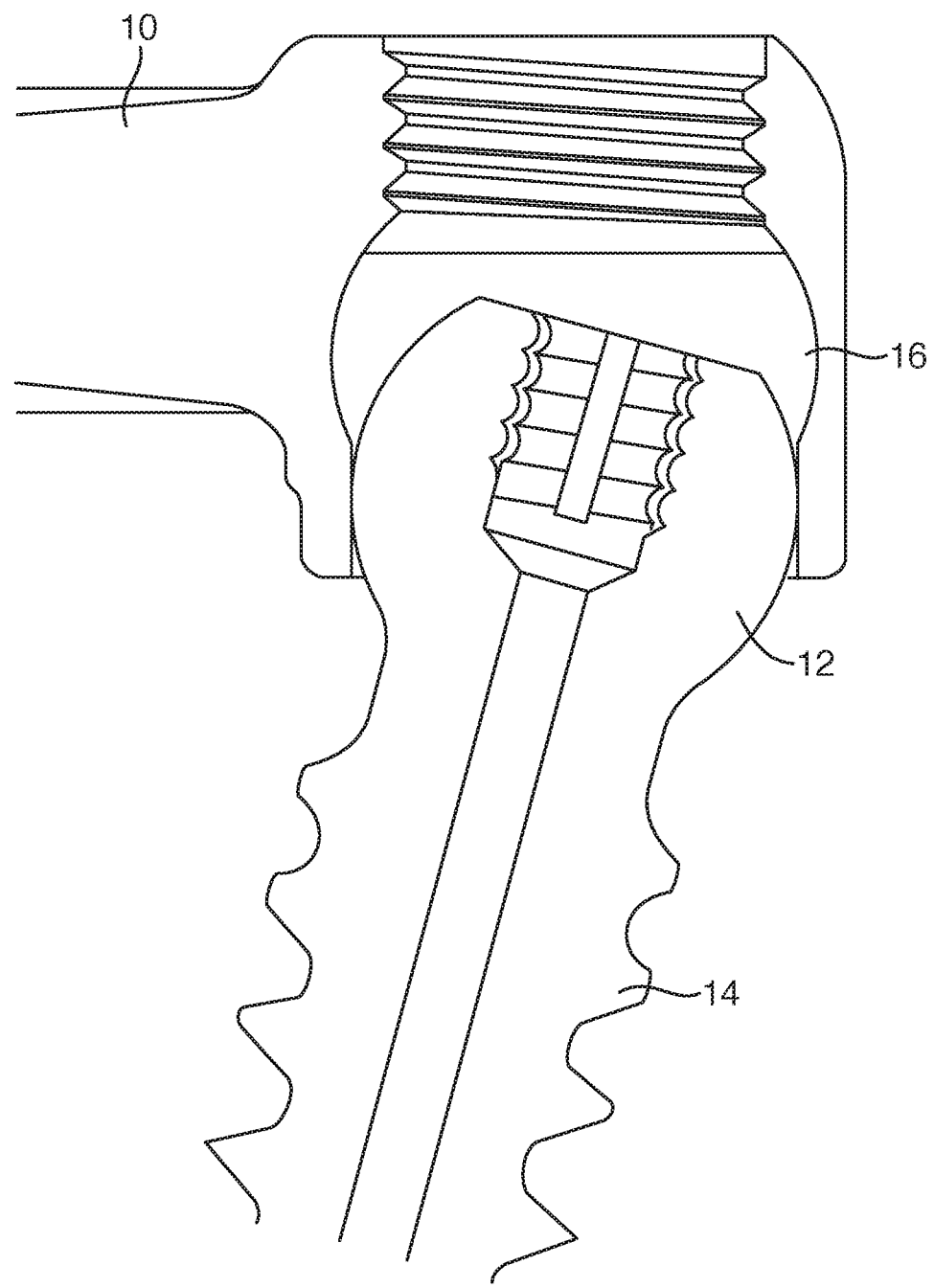
FIG. 1 shows a sectional view of a pedicle screw coupling system.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

According to embodiments of the invention, variations on improved pedicle screw coupling assemblies are provided, along with methods for use of such assemblies. According to certain embodiments of the invention, a coupling assembly is capable of providing rigid fixed attachment between a pedicle screw fully seated to underlying bone and a member extending between adjacent pedicle screws. The coupling assembly includes a pedicle screw having a threaded shaft and a head portion. The head portion includes a driving feature and a proximally oriented bore having a bore diameter. The coupling assembly also includes a member adapted to extend between adjacent pedicle screws. The member includes a protrusion adapted for insertion into the bore of the pedicle screw, the protrusion having a protrusion diameter that is larger than the bore of the pedicle screw head portion.

The bore may be cylindrical, and the protrusion may include a partially spherical surface. Insertion of the protrusion into the bore may be made possible by an application of force that forces a point of maximum diameter of the protrusion fully within the bore. Full insertion of the protrusion may cause a distal surface of the protrusion to contact a distal portion of the bore.

The bore may be adapted to receive the protrusion at a variety of insertion angles. For example, the bore may be adapted to receive the protrusion at any angle between an axis of symmetry of the screw and an axis of symmetry of the protrusion of up to thirty degrees.

The member may also include an anvil opposite the protrusion. The anvil may have a partially spherical surface adapted to receive an insertion force to force the protrusion into the bore. The head portion may include an annular ridge on an outer surface of the head portion. The annular ridge may assist in the development of force between the head portion and the member. When the protrusion is received within the proximally oriented bore, a press fit is created between the protrusion and the head portion.

According to alternative embodiments of the invention, a coupling assembly is capable of providing rigid fixed attachment between a pedicle screw fully seated to underlying bone and a member extending between adjacent pedicle screws. The coupling assembly includes a pedicle screw having a threaded shaft and a head portion. The head portion includes a driving feature, an external bore-engaging surface defining an external diameter of the head portion, and a proximally oriented screw bore having a proximal portion with a first, narrower diameter and a medial portion with a second, broader diameter. The coupling assembly also includes a member adapted to extend between adjacent pedicle screws. The member includes a female member having a receiving bore adapted to receive the head portion of the pedicle screw therein, the receiving bore having an inner diameter that is smaller than the external diameter of the pedicle screw head portion.

The external bore-engaging surface may be partially spherical. The proximally oriented screw bore may define a partially spherical surface, and the diameter of the proximal portion smaller than a diameter of the partially spherical surface. The receiving bore may be cylindrical.

The female member may include an access bore extending through the female member from a terminal end of the receiving bore. The screw bore may be adapted to receive an engaging tip of a tool adapted to apply an engaging force between the head portion and the female member. When the head portion of the pedicle screw is disposed within the receiving bore, a press fit is created between the head portion and the receiving bore. The coupling assembly may include a partially spherical tip disposed within the proximally oriented screw bore, as well as an expansion pin disposed within the partially spherical tip.

The features as described herein may allow the surgeon to insert the pedicle screw fully until it is fully seated against the bone while still being able to apply force between the pedicle screw and the member extending between pedicle screws so as to fixedly attach the member to the pedicle screw or screws via a press fit. Prior devices have not been able to provide this capability.

In prior systems, the end of a rod 10 or other member linking pedicle screws and a head 12 of a pedicle screw 14 were rigidly interconnected via an interference or press fit between a spherical portion of the head 12 of the pedicle screw 14 and a cylindrical portion of a bore 16 integral to the rod 10, as shown in FIG. 1. The diameter of the head 12 is larger than the diameter of the cylindrical portion of the bore 16, and the elastic and/or plastic deformation of the head 12 and/or rod 10/bore 16 creates the press fit or interference fit. The term "interference fit" was described as including the joining of any two mating parts such that one or the other (or both) parts slightly deviate in size from their nominal dimension, thereby deforming each part slightly, the male part being compressed and the female part expanding, the interface between two parts creating a union of extremely high friction. The word interference refers to the fact that one part slightly interferes with the space that the other is occupying in its nominal dimension.

According to one exemplary embodiment, the allowance, or planned difference from nominal size of both the internal diameter defined by the screw head contact surface of the bore 16 is smaller than the maximum screw head diameter of the screw head 12 is sufficiently large that the force sufficient to overcome the resulting interference fit between the screw head contact surface of the bore 16 and the screw head 12 is larger than a force sufficient to pull the screw 14 out of a bone.

The surgical interconnection between the screw head 12 and the rod 10 is achieved by using a surgical instrument that grasps and secures the pedicle screw head 12 on its distal aspect while simultaneously pushing the rod 10 over the head 12 of the pedicle screw 14 until the press fit or interference fit is achieved. One difficulty with such systems is that it can be difficult for the surgical instrument to engage the head 12 of the pedicle screw 14 if the surgeon has inserted and tightened the screw 14 to the point where the head 12 contacts and is flush with the underlying bone. At that point, it is difficult to impossible for the surgeon to engage the distal aspect of the head 12 with the instrument, as there is insufficient room underneath the head 12 for the end of the instrument. Thus, surgeons must be careful and conscious to ensure that the pedicle screw 14 is not inserted to such an extent. Furthermore, because the screw 14 is not maximally inserted, the total implant may not be as low profile as might otherwise be achieved if the screw 14 could be maximally inserted.

Embodiments of the invention provide systems that can function whether or not the screw 14 is fully inserted until the head 12 contacts and is fully seated against the underlying bone. A first exemplary system is illustrated with respect to FIGS. 2-5 and 16. A second exemplary system is illustrated with respect to FIGS. 6-15 and 17. In the first system, the male and female relationship between the screw head 12 and the rod 10 are effectively inverted, but the rigid interconnection between the screw head 12 and the rod 10 is achieved on similar principles of achieving a press fit or interference fit between the head 12 and the rod 10.

In such an embodiment, each end of the rod 10 or other interconnecting member has a protrusion 20 extending therefrom. The protrusion 20 in this embodiment is partially spherical, which allows the rod 10 to achieve a variety of insertion angles into the screw head 12, including angles up to around thirty degrees (i.e. where a central axis of symmetry of the screw 14 lies at an angle of up to around thirty degrees from an axis of symmetry of the protrusion 20). Other embodiments of the system may permit insertion angles of up to around twenty-five degrees, up to around twenty degrees, up to around fifteen degrees, up to around ten degrees, up to around five degrees, or to any other amount roughly within these ranges. The protrusion 20 serves as a male member of a male-female pair capable of forming an interference or press fit.

The screw head 12 is formed with a proximally oriented bore 22 therein. The bore 22 is proximally oriented in that it is proximal the surgeon during the spinal fusion surgery. The bore 22 of the illustrated embodiment has a protrusion-contacting portion that defines a cylindrical surface capable of engagement with the protrusion 20 to form the interference fit or press fit. The head 12 also includes a ridge 24 protruding outward around an upper edge of the head 12, which provides a location for engagement of a surgical instrument to apply the force necessary to press the protrusion 20 down into the bore 22 of the head 14. Because the protrusion 20 is larger in diameter than the diameter of the bore 22, significant force is required for insertion, and once the protrusion 20 is inserted, it will not fall out on its own under normal forces encountered by the spine.

While one portion of the insertion instrument engages the ridge 24, another portion of the insertion instrument applies a force to a proximal face 26 of the rod 10. The proximal face 26 of the illustrated embodiment defines a partially spherical surface, such that regardless of the orientation of the rod 10 relative to the screw 14, an insertion force can be applied straight into the bore 22. In the illustrated embodiment, the partially spherical surface of the proximal face 26 and the partially spherical surface of the protrusion 20 share a common center (within the protrusion 20).

Figure 2:
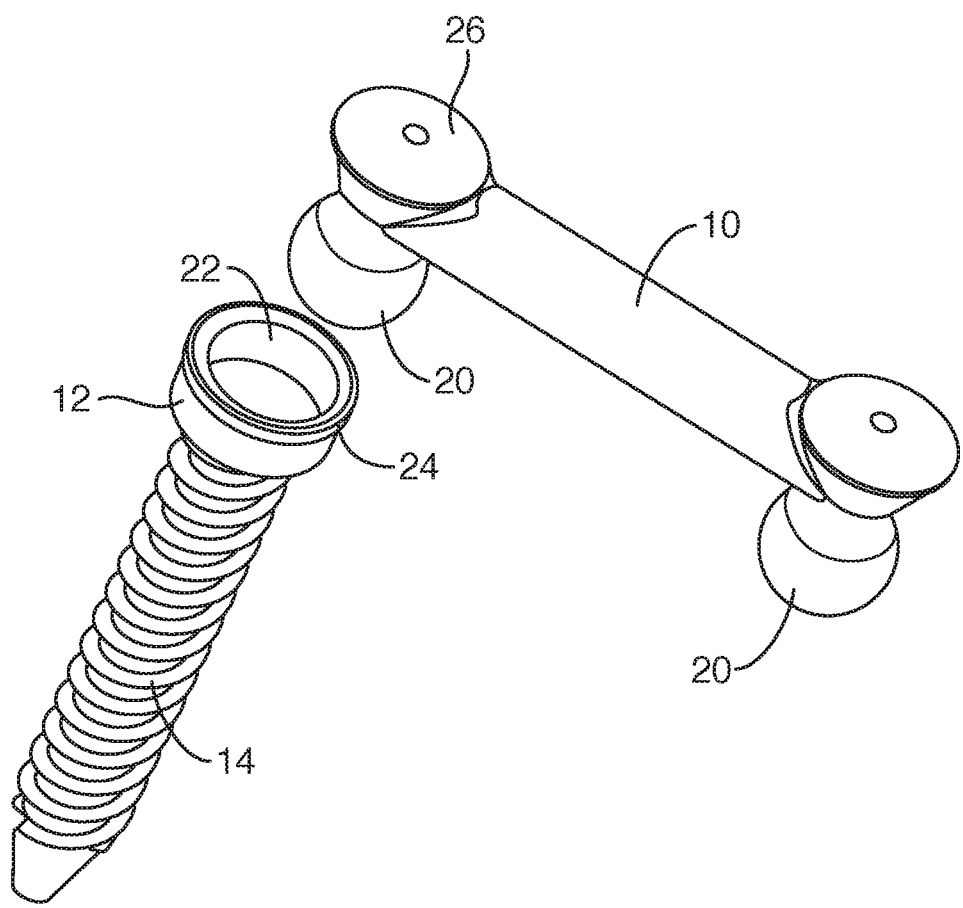
FIG. 2 shows a perspective view of an unassembled pedicle screw coupling system.
Figure 3:
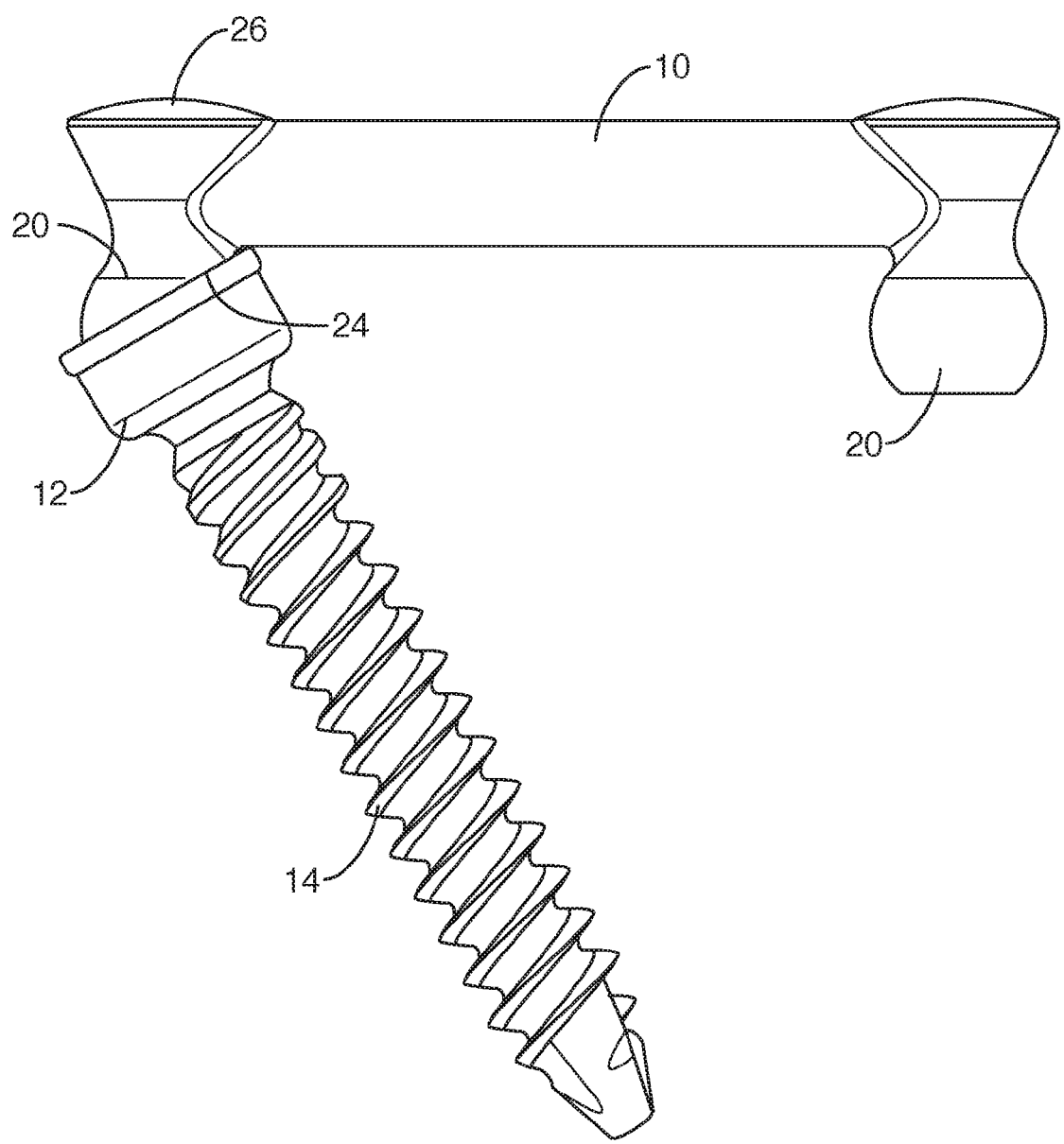
FIG. 3 shows a side view of an assembled pedicle screw coupling system.
Figure 4:
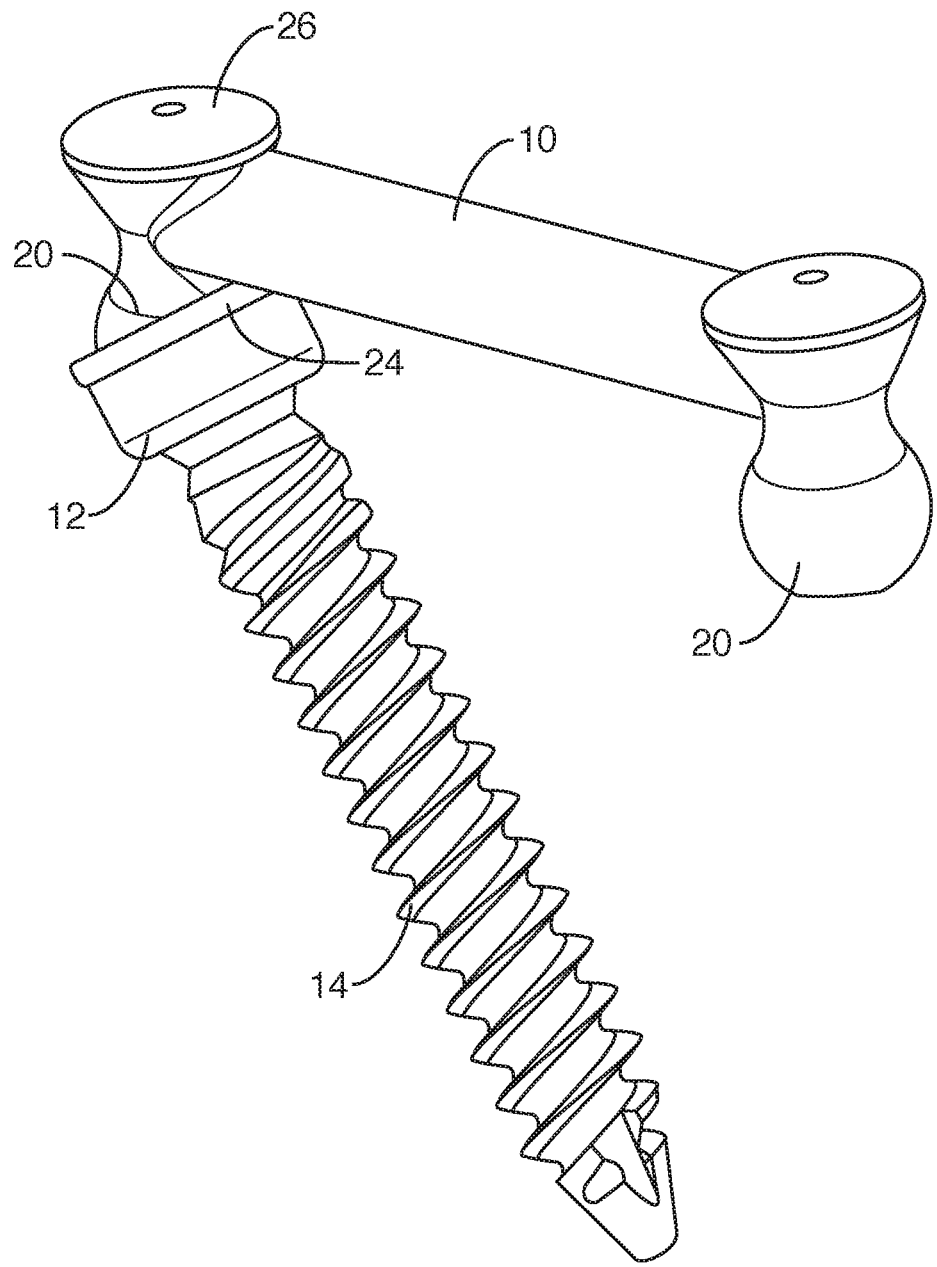
FIG. 4 shows a perspective view of an assembled pedicle screw coupling system.

FIG. 2 shows illustrative embodiments of the screw 14 and the rod 10 prior to insertion of the protrusion 20 into the bore 22. FIGS. 3 and 4 show the embodiments of FIG. 2 after an insertion procedure has occurred. As may be seen in FIGS. 3 and 4, the protrusion 20 has been inserted into the bore 30 with the rod 10 at a significant angle relative to the screw 14.

Figure 5:
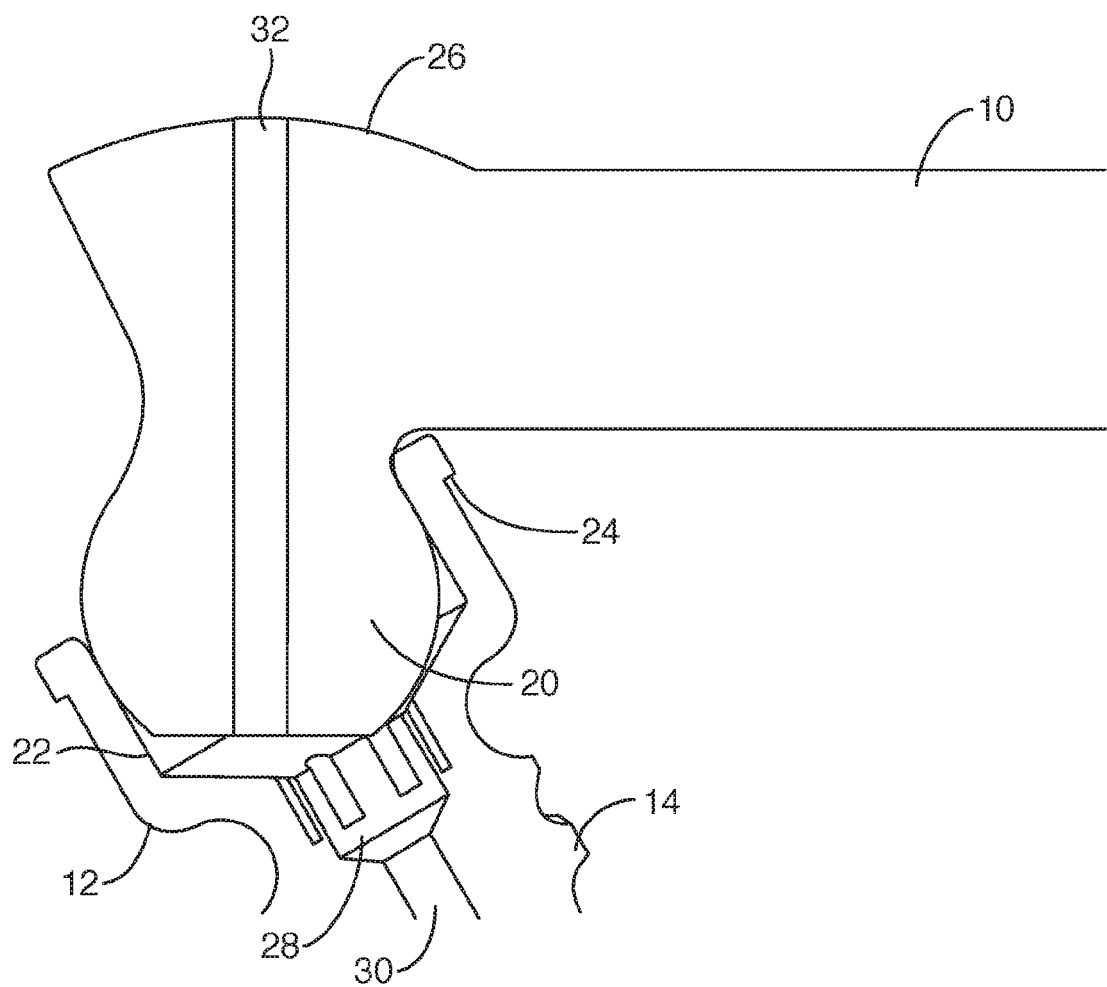
FIG. 5 shows a sectional view of a pedicle screw coupling system.

FIG. 5 shows a sectional view of the screw and rod embodiments of FIG. 2, with the protrusion 20 fully inserted into the bore 22. As may be seen from FIG. 5, the protrusion 20, when fully inserted in the bore 22, may contact a distal surface of the bore 22, preventing further insertion of the protrusion 20. FIG. 5 also illustrates that the screw 14 may include a driving feature 28 such as a hexalobe driving feature located at the most distal portion of the bore 22. It should be noted that any other driving feature may be used, including one or more features along the rim of the head 12. The screw 14 may also include a cannula 30 used for guiding insertion of the screw 14, and the rod 10 may also include a cannula 32 for similar purposes of guiding insertion of the rod 10.

Figure 6:
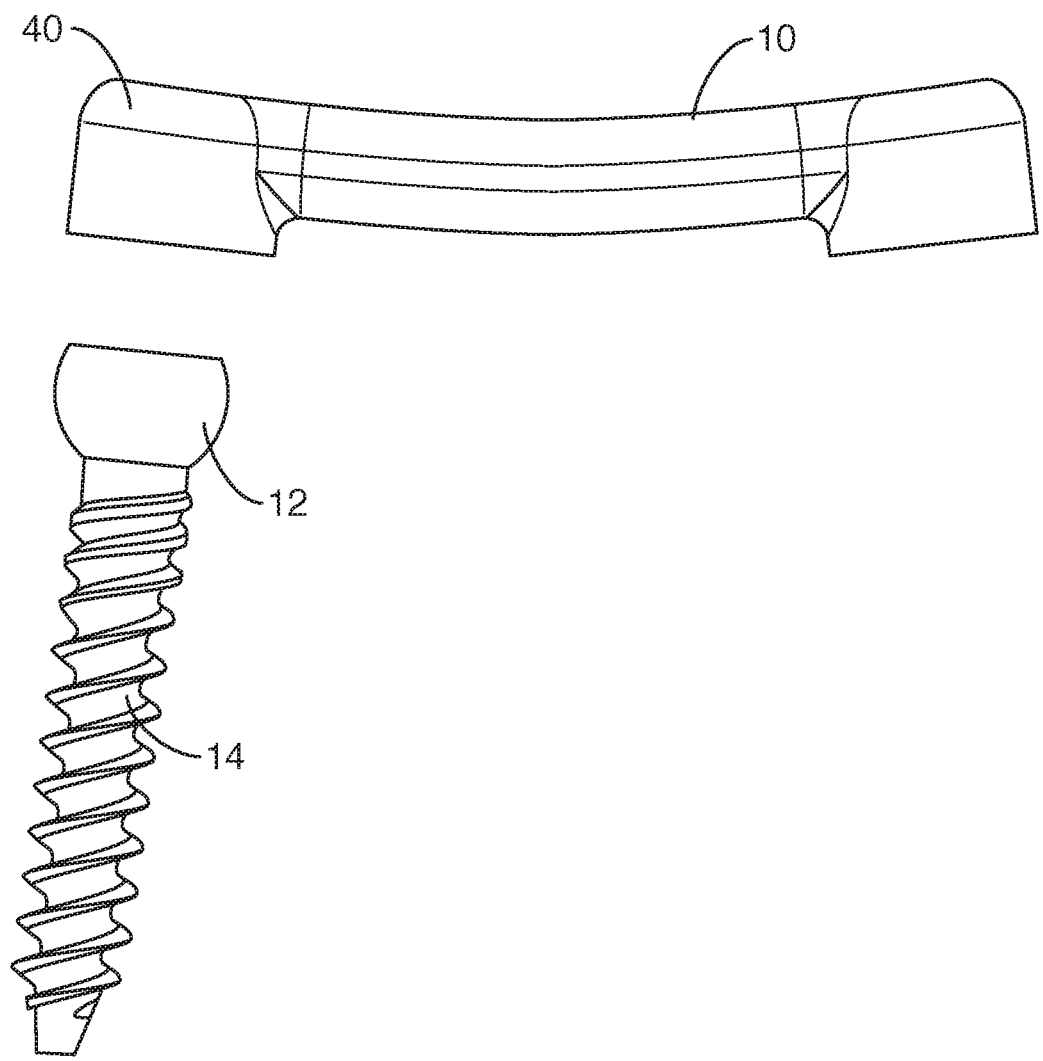
FIG. 6 shows a side view of an unassembled pedicle screw coupling system.
Figure 7:
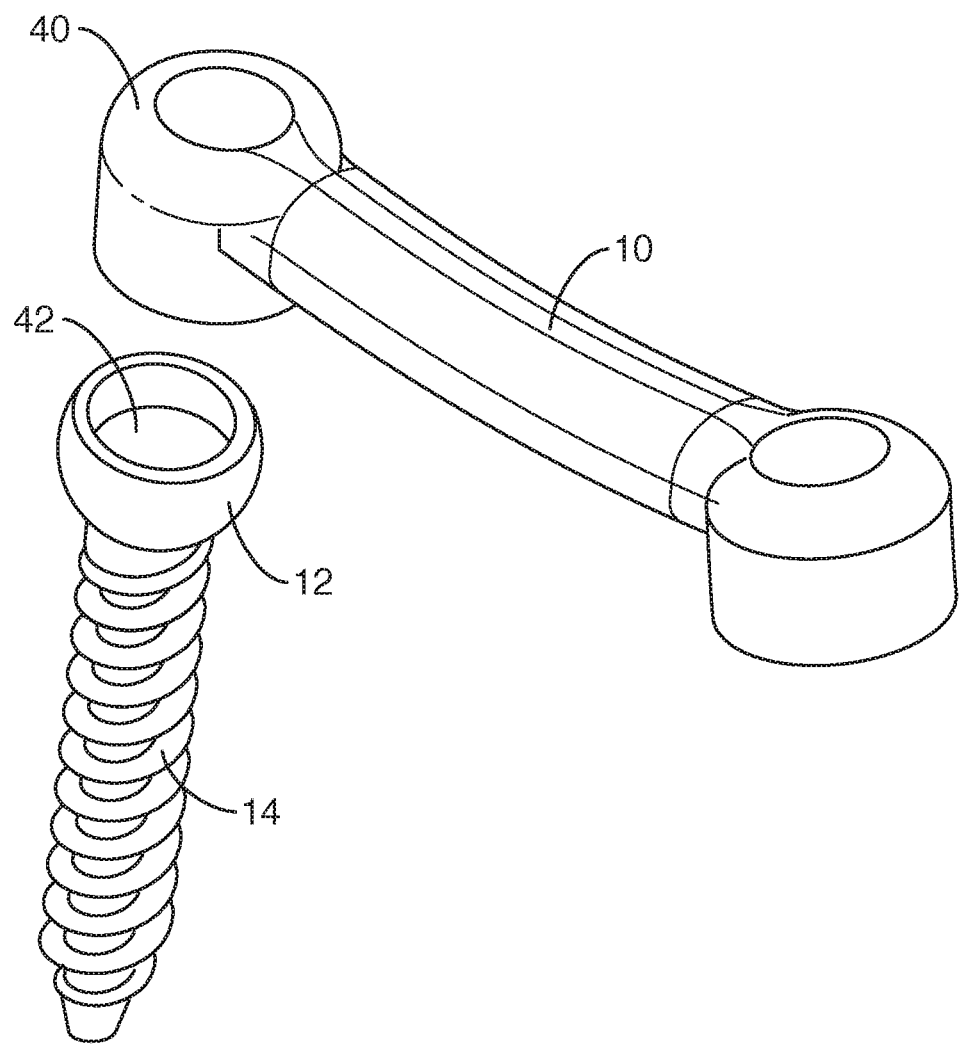
FIG. 7 shows a perspective view of an unassembled pedicle screw coupling system.
Figure 8:
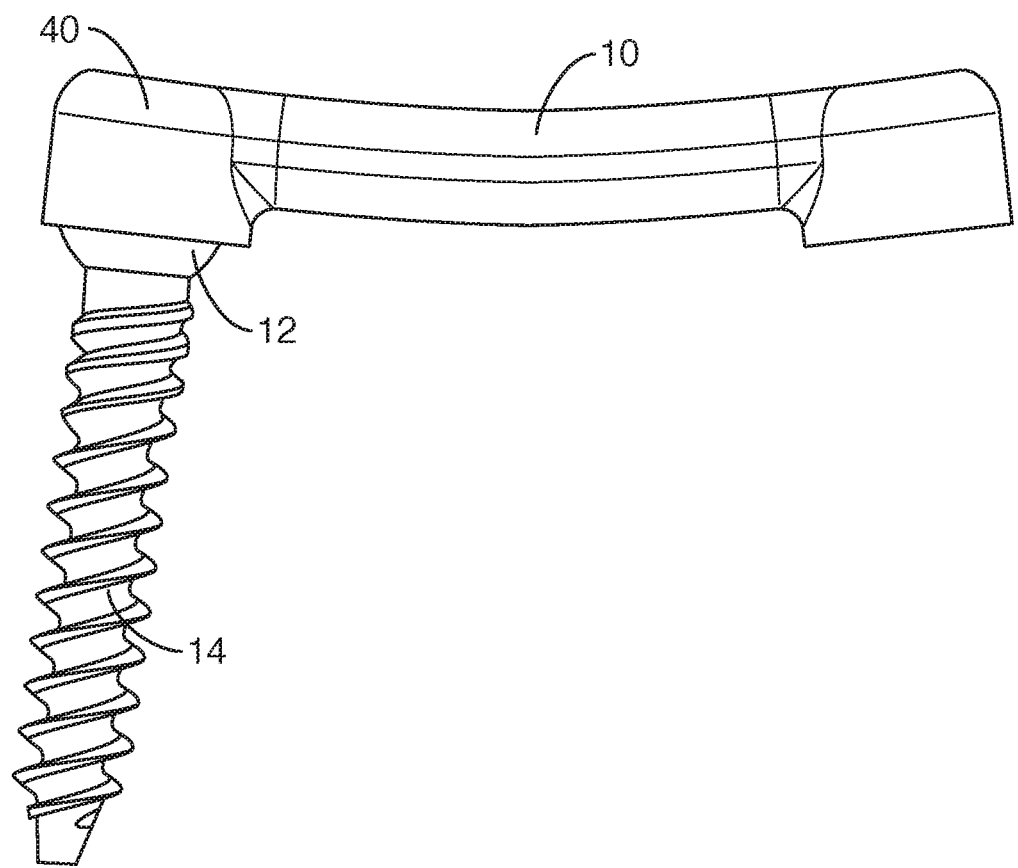
FIG. 8 shows a side view of an assembled pedicle screw coupling system.
Figure 9:
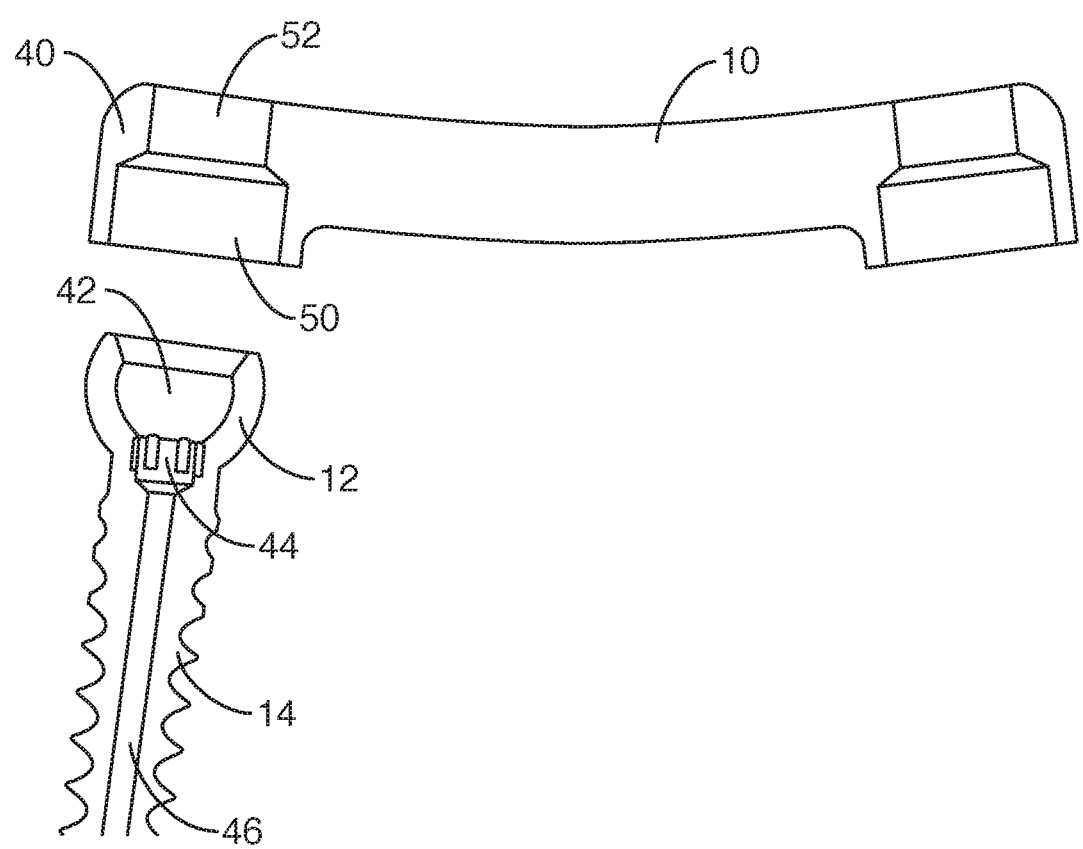
FIG. 9 shows a sectional view of an unassembled pedicle screw coupling system.

In a second exemplary system as illustrated in FIGS. 6-15 and 17, the original male-female relationship of the system shown in FIG. 1 is maintained, but additional features are provided to allow the surgeon to apply engaging forces between the screw 14 and the rod 10 even when the screw 14 is fully inserted into the bone with the screw head 12 fully seated against the underlying bone. In this embodiment, the rod 10 includes an female coupler 40 or other female member adapted to receive the screw head 12. The screw head 12 in this embodiment has an outer bore-engaging surface defining an external diameter of the screw head 12. In this example, this outer surface is partially spherical, allowing any orientation of the axis of symmetry of the screw 14 relative to the axis of symmetry of the female coupler 40 up to about thirty degrees in this example. In other examples, the orientation may be allowed up to about twenty-five degrees, up to about twenty degrees, up to about fifteen degrees, up to about ten degrees, up to about five degrees, or any amount roughly within these ranges. Regardless of the angle of the screw 14 relative to the rod 10, the pressure achieved by forcing the head 12 a predetermined depth into the female coupler 40 generates significant pressure (via the press fit or interference fit) on the head 12 of the screw 14, and this pressure is sufficient to lock the screw 14 to the rod 10. FIGS. 6 and 7 show views of one embodiment of the system prior to assembly, and FIGS. 8 and 9 show views of that embodiment subsequent to assembly.

FIG. 9 shows a sectional view of one embodiment of the system, illustrating additional features of the system. In this embodiment, the head 12 of the screw 14 includes a proximally oriented screw bore 42. As may be seen by FIG. 9, the screw bore 42 has a varying dimension, such that a more proximal portion of the screw bore 42 has a smaller diameter than a more distal portion of the screw bore 42. Specifically, in the illustrated embodiment, at least a portion of the screw bore 42 is formed as a partially spherical surface having a diameter that is larger than the diameter of a more-proximal portion of the screw bore 42. Also disposed within the screw bore 42 is a driving feature 44 such as a female hexalobe driving feature similar to that discussed above. Other driving features could be used instead, such as one or more external driving features around the circumference of the head 12 of the screw 14. Combinations of driving features could also be used, such as an internal hexalobe in combination with any external driving features around the circumference of the head 12 of the screw 14. As discussed previously, the screw 14 may optionally contain a cannula 46 for guiding purposes.

The interior of the female coupler 40 is also more clearly visible in FIG. 9. The female coupler 40 includes a receiving bore 50 having a diameter that is smaller than the outer diameter of the screw head 12. In the illustrated embodiment, the receiving bore 50 is cylindrical, although the receiving bore 50 could also be spherical or could take other polyhedral and cylindrical polygonal shapes. The receiving bore 50 is communicatively coupled to an upper bore 52 such that the upper bore 52 and the receiving bore 52 form a continuous channel of varying dimensions passing entirely through the female coupler 40. Although not illustrated in FIG. 9, the upper bore 52 may be threaded to facilitate threaded attachment of one or more surgical instruments or tools, such as an un-locker that screws into the upper bore 52 and gradually pushes the screw head 12 out of the receiving bore 50. Regardless, the continuous channel formed by the upper bore 52 and the receiving bore 52 may serve in part to form a cannula through the female coupler 40 that may be used in part for guiding purposes as discussed previously. The continuous channel serves an additional purpose that facilitates an optional mode of applying the necessary forces to lock the body 10 to the screw 14, as will be discussed in more detail below with respect to FIGS. 11-15.

Figure 10:
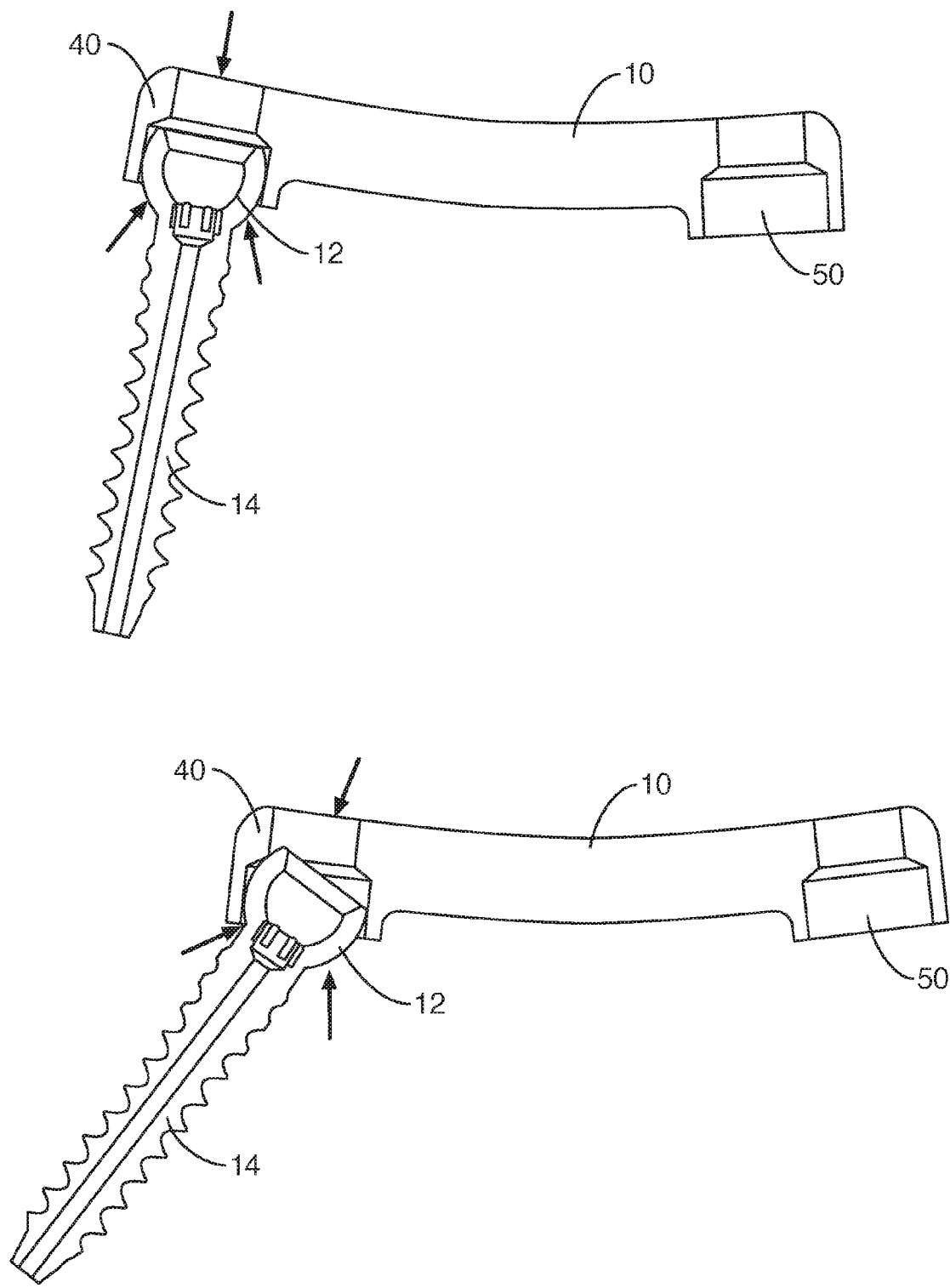
FIG. 10 shows sectional views illustrating one method for assembling a pedicle screw coupling system.
Figure 11:
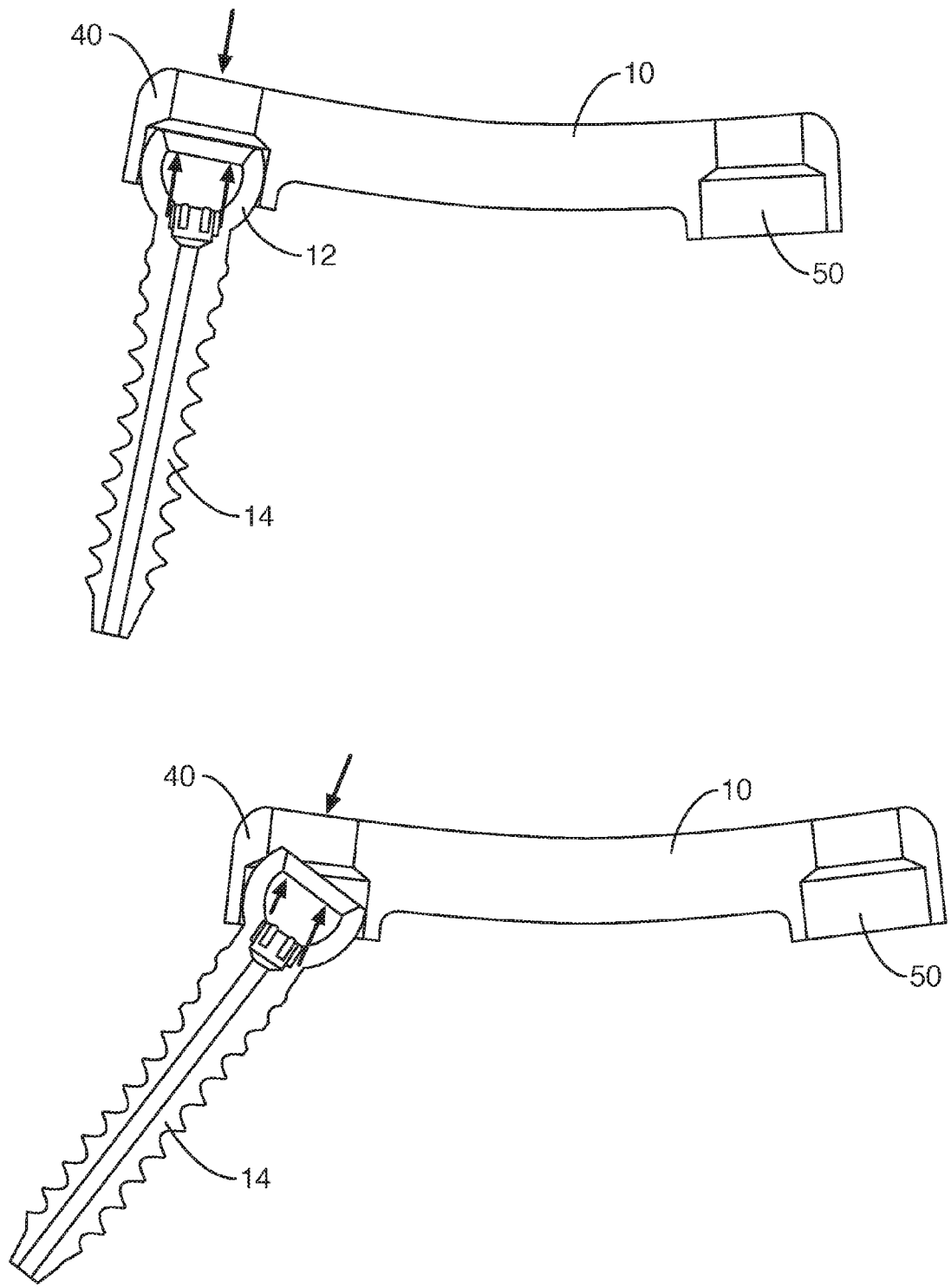
FIG. 11 shows sectional views illustrating another method for assembling a pedicle screw coupling system.
Figure 14:
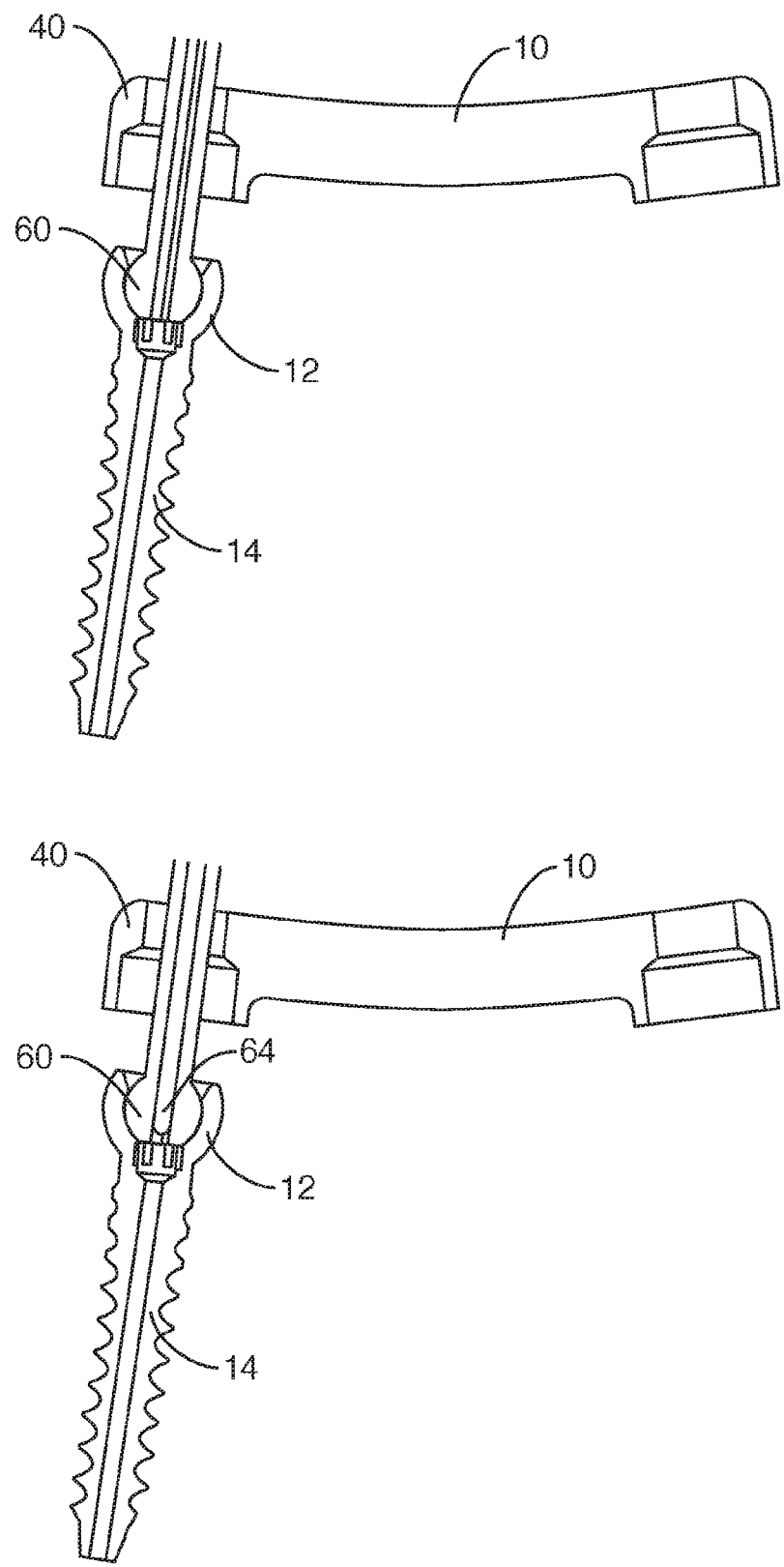
FIGS. 14-15 illustrate a method for using a locking instrument to assemble a pedicle screw coupling system.
Figure 15:
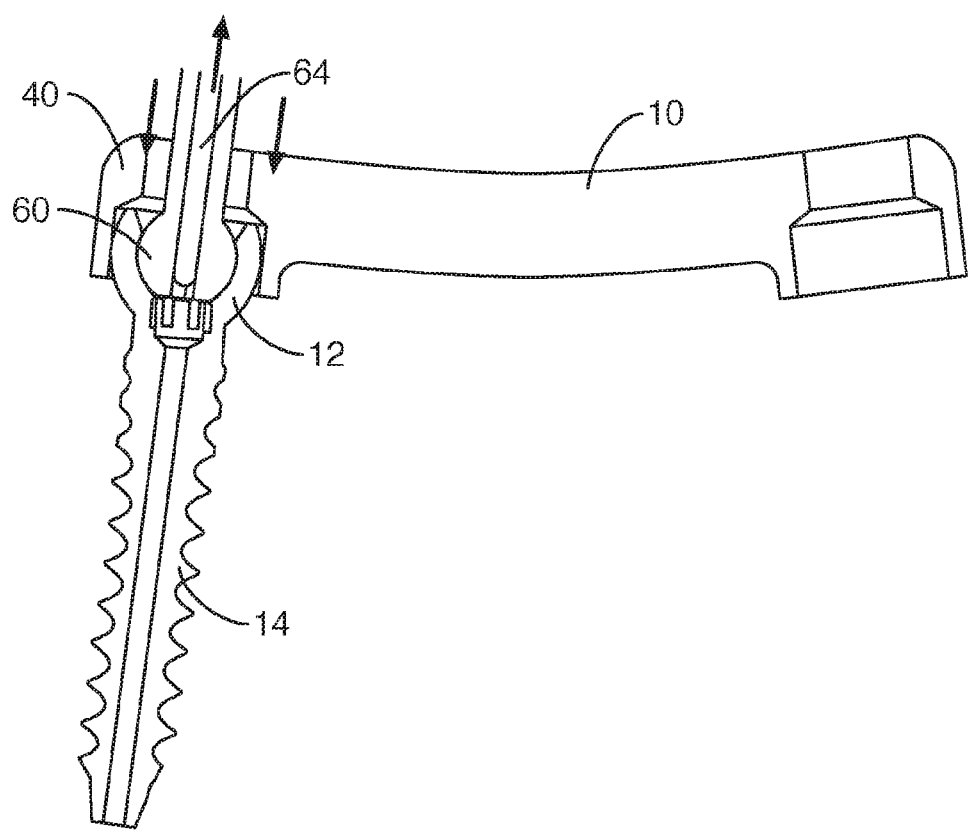
Figure 15:
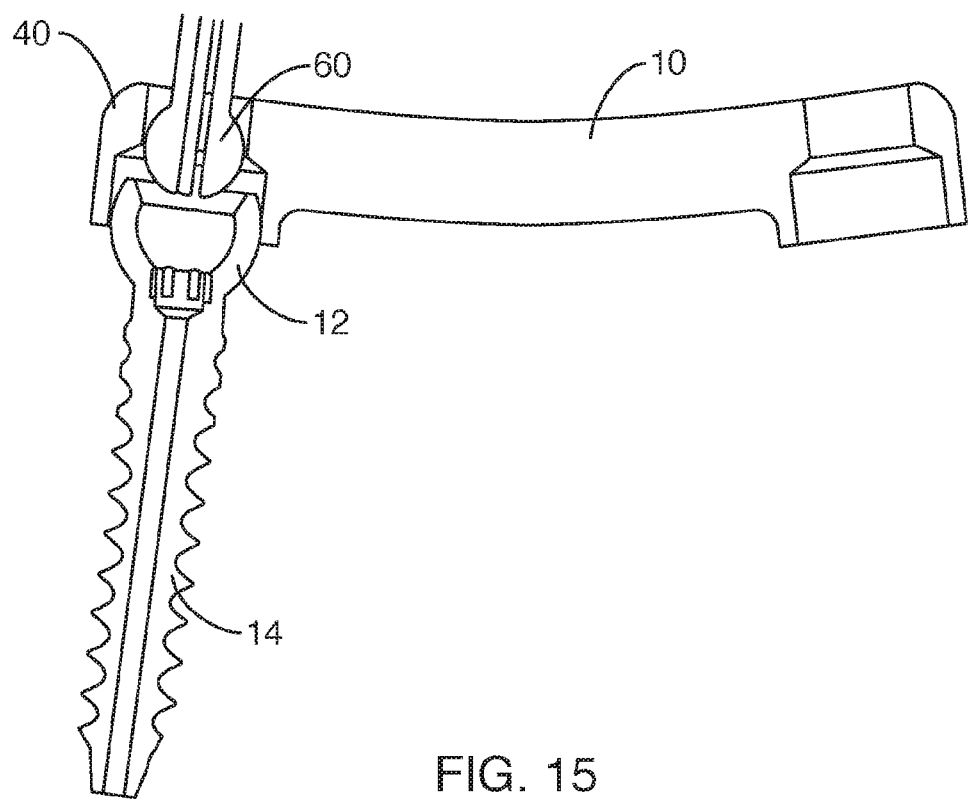

In FIG. 10 and in FIGS. 11, 14, and 15, the vertebral body is omitted from the images, but the screw threads are assumed to be fully or nearly fully within the bone. All directions given with respect to these Figures are given relative to the as-drawn orientation as opposed to any anatomical orientation, such that the terms "up" and "above" refer to upward or above on the printed page. In use, after the pedicle screws 14 have been inserted into the vertebrae, the screws 14 and the rod 10 may be assembled in one of two ways. The first manner of assembling the system is illustrated in FIG. 10.

According to a first assembly option as illustrated in FIG. 10, a surgical instrument may be used to engage and support the head 12 of the pedicle screw 14 from below while simultaneously pushing the rod 10 from above to force the rod's receiving bore 50 over the head 12 of the pedicle screw 14. This surgical instrument contacts the head 12 of the screw 14 between the bottom of the rod 10 and the bone at the approximate locations indicated by the lower arrows in FIG. 10.

However, supporting the pedicle screw from below imposes limitations on the depth to which the screw 14 can be inserted into bone, and the maximum polyaxial angle between the screw 14 and the rod 10. The surgeon must always insert the screw 14 to a depth which allows access to the screw neck and underside of the screw head 12. If the screw 14 were implanted such that the screw head 12 were flush to the bone, the locking instrument could not access the underside of the screw head 12. Additionally, when the pedicle screw 14 is rotated to the limit of is polyaxial angle (e.g., the lower view of FIG. 10 as opposed to the upper view of FIG. 10), the screw neck comes into close proximity to the rod 10, leaving little or no space for a surgical instrument to support the underside of the screw 14 (see the left-most arrow in the lower view of FIG. 10). Nevertheless, the system may still be used as with past systems and using similar tools and techniques.

The embodiment of the system shown herein avoids these problems by providing an alternate means for engaging the screw head 12. In an alternate technique, a purpose-built surgical instrument grasps the inner spherical cavity defined by the screw bore 42 of the pedicle screw 14 while the rod's cylindrical receiving bore 50 is pushed down over the screw head 14 as illustrated in FIG. 11. Using this method, the surgical instrument only contacts features within and directly above the pedicle screw 14. Also, there is no need to access the screw neck, or the underside of the screw head 12. Thus, the screw 14 can be inserted with its head 12 flush to the bone (if desired by the surgeon) and the implant's full polyaxial range remains available.

The force required to assemble the construct acts along a line that is parallel to the axis of the rod's cylindrical receiving bore 50, regardless of the polyaxial angle of the screw 14. Thus, the locking instrument is able to engage with the screw 14 oriented at any angle within its polyaxial range, while applying a force that is parallel to the axis of the rod's cylindrical receiving bore 50. The tip of the locking instrument and the internal spherical cut of the screw bore 42 within the pedicle screw 14 can form a multi-axis joint. This multi-axis joint allows the pedicle screw 14 to be orientated at any angle within its polyaxial range, while the applied force remains parallel to the axis of the rod's cylindrical receiving bore 50.

Figure 12:
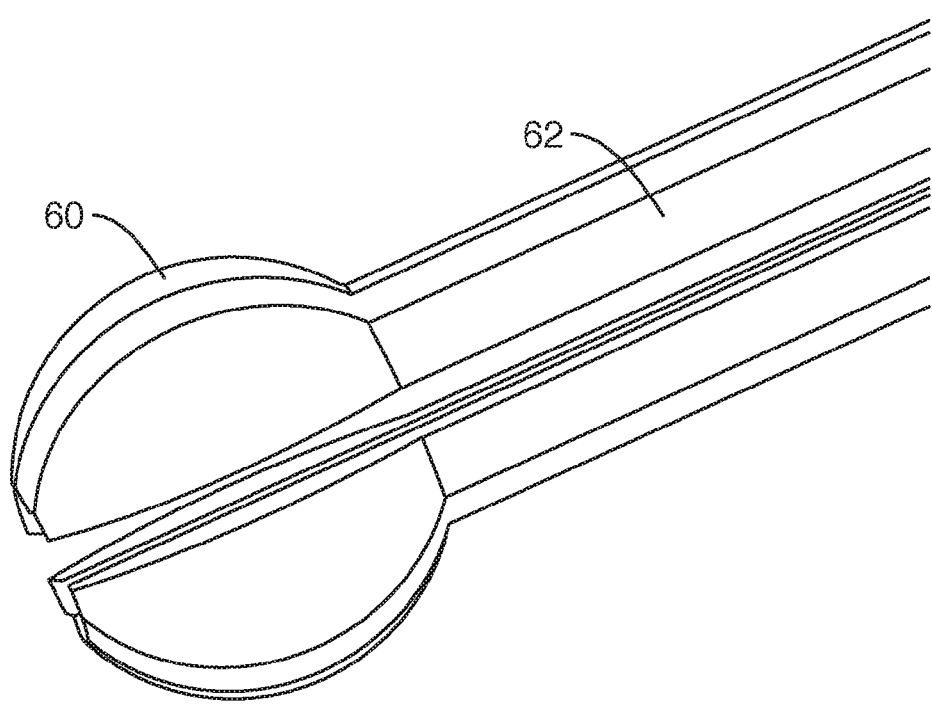
FIG. 12 shows a perspective view and an end view of a tip end of a locking instrument for assembling a pedicle screw coupling system.
Figure 12:
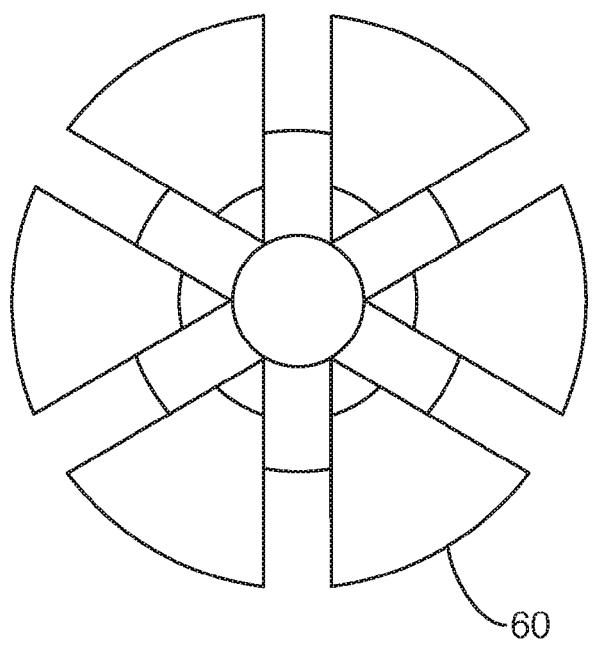
Figure 13:
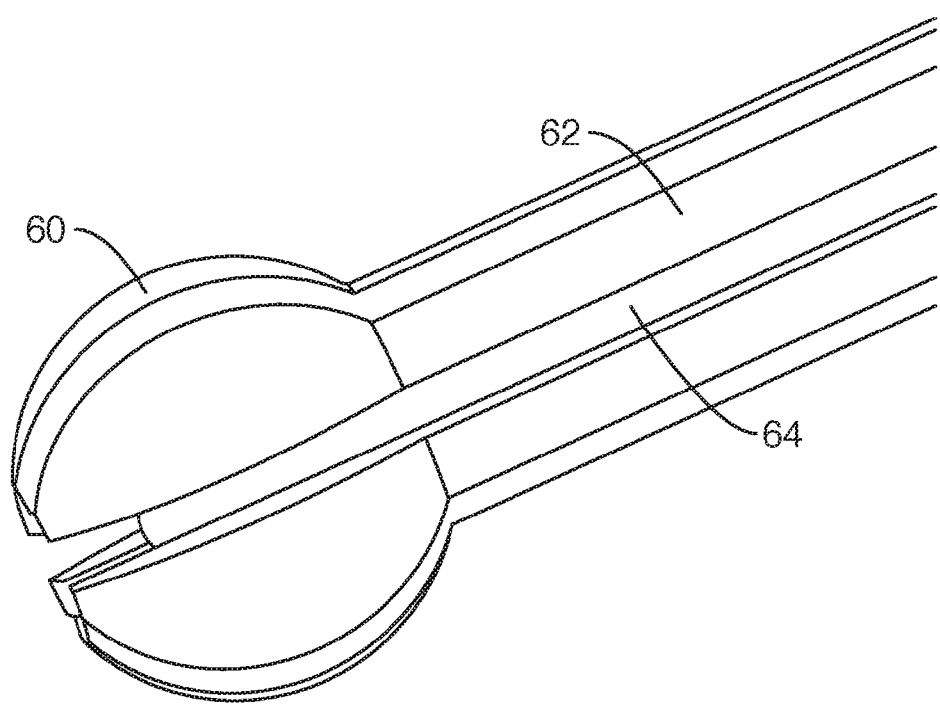
FIG. 13 shows a perspective view and an end view of a tip end of a locking instrument for assembling a pedicle screw coupling system, with an expansion pin inserted through the middle thereof.
Figure 13:
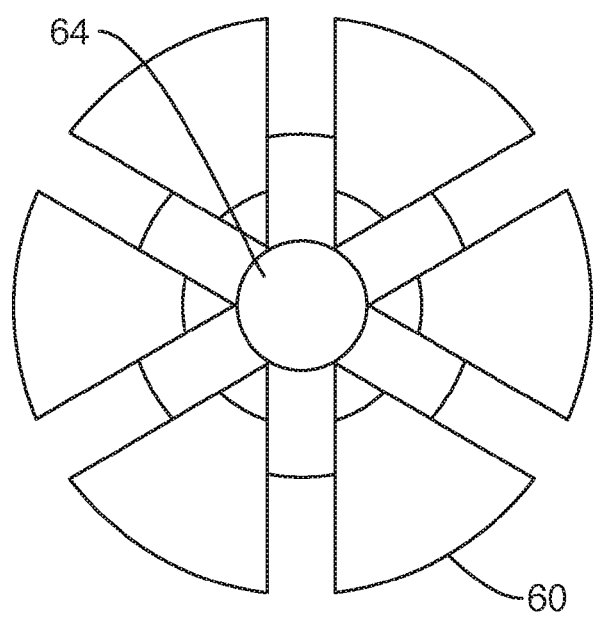

In one possible embodiment, as illustrated in FIG. 12, a tip 60 of the locking instrument may be a slotted sphere on a slotted shaft 62 with an expansion pin 64 being selectively inserted to extend down the center of the instrument tip 60. FIG. 12 illustrates the instrument tip 60 without the expansion pin 64 in place. Without the expansion pin 64, the instrument's spherical tip 60 can collapse, allowing it to pass through the opening at the top (proximal end) of the screw's spherical cavity defined by the screw bore 42. FIG. 13 illustrates the instrument tip 60 with the expansion tip 64 in place. The expansion pin 64 prevents the spherical tip 60 from collapsing, which prevents the spherical tip 60 from passing back through the opening at the top of the screw's spherical cavity defined by the screw bore 42.

FIGS. 14-15 illustrate how the pedicle screw 14 and rod 10 may be assembled using such an instrument. As shown in the top view of FIG. 14, the instrument tip 60 is inserted through the upper bore 52 and receiving bore 50 of the female coupler 40 and down into the screw bore 42 without the expansion pin 64 in place, allowing the spherical tip 60 to collapse and pass through the opening at the top of the screw 14. As illustrated in the bottom view of FIG. 14, the expansion pin 64 is inserted, constraining the spherical tip 60 to its full diameter. Then, as illustrated in the top view of FIG. 15, the surgeon operates the surgical instrument to pull up on the instrument tip while an eternal sleeve or other instrument feature (not shown) pushes down on the top of the rod 10. The expansion pin 64 is then removed allowing the instrument tip 60 to collapse and pass through the opening at the top of the screw 14, as illustrated in the bottom view of FIG. 15.

Additional embodiments implementing or varying the concepts discussed herein may include embodiments such as the following. In one embodiment, a pedicle screw 14 has an internal multi-axis joint including a spherical cavity cut into the screw head 12. Pre-operatively, a sphere on a shaft is inserted into the screw 14 so as to protrude slightly from the screw 14. After the screw 14 was inserted into the bone, a surgical instrument would grasp and pull the protruding shaft while pushing down on the rod 10. After assembly, the sphere on a shaft could alternatively remain in the pedicle screw 14, or be removed by the locking instrument.

In another embodiment, a pedicle screw 14 has an internal multi-axis joint including a spherical cavity cut into the screw head 14 and a surgical instrument includes a single use tip that might be similar in appearance to tip 60. The single use tip would be intraoperatively inserted into the pedicle screw 14, and would remain in the screw 14 after locking.

In another exemplary embodiment, a pedicle screw 14 has a multi-axis joint that is either integral to or intra-operatively affixed to the exterior of the screw, rather than the interior of the screw.

Another embodiment represents an inversion of this concept in which the pedicle screw 14 has a cylindrical bore, which receives a spherical head or protrusion integral to the end of the rod 10. The spherical head of the rod 10 would have an internal cavity which would form a multi-axis joint with a surgical instrument. The surgical instrument would then apply a downward pressure to this internal cavity while pulling upward on the screw's cylindrical head 12. In this case, the direction of applied force would be parallel to the axis of the screw. The male portion of the rod's multi-axis joint could be integral to the rod 10, integral to the surgical instrument, or removable from either.

Figure 16:
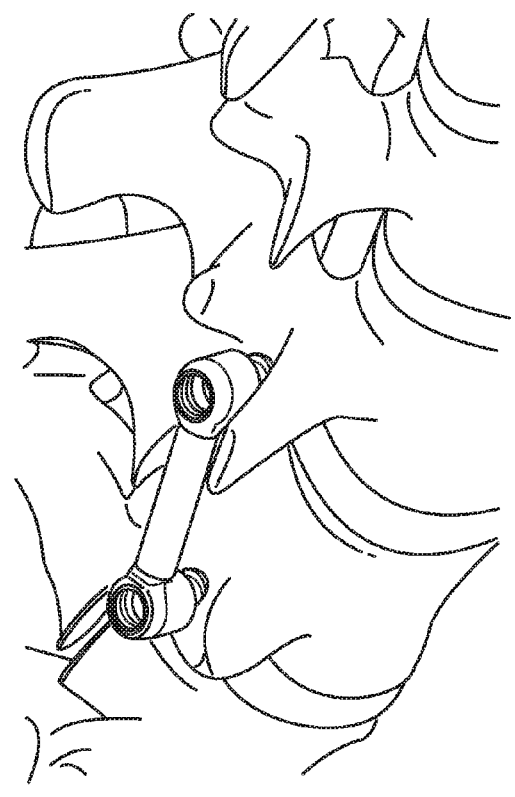
FIGS. 16-17 provide comparative illustrations of various pedicle screw coupling systems in use.
Figure 16:
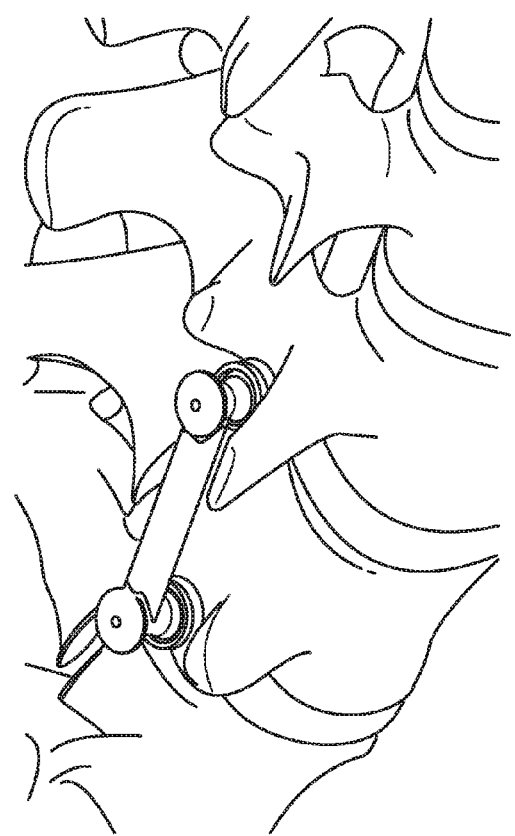
Figure 17:
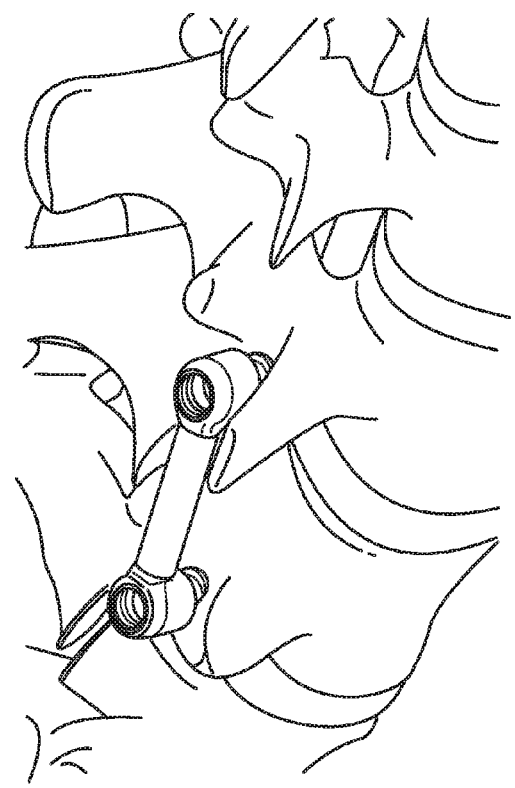
Figure 17:

FIGS. 16 and 17 illustrate illustrative advantages of the described illustrative embodiments of the present invention as compared to devices not incorporating the features discussed herein. To that effect, FIG. 16 shows two views, with the left view illustrating the first system discussed herein with the right view illustrating the previous system, and FIG. 17 shows two views, with the left view illustrating the second system discussed herein with the right view illustrating the previous system. To illustrate the advantages achievable with respect to these systems, illustrative measurements are given, but it should be understood that the measurements are given only to illustrate advantages achievable with embodiments of the described invention, and that measurements could vary depending on the surgical site chosen (e.g. a L4-L5 spinal fusion surgery as opposed to a L5-S1 spinal fusion surgery), anatomical differences between patients, and any of a variety of other considerations. To that end, the given measurements are instructive and illustrative only.

In FIGS. 16 and 17, the previous device (right view) has an implant diameter of approximately 0.360 inches and a minimum distance from the top of the coupler to the bone of 0.519 inches. The minimum height is greater than the height of the coupler and the screw head because of the need to have the neck of the screw exposed below the screw to give room for the surgical instrument to engage the screw head from below.

The first system described (illustrated by the left view of FIG. 16) has a diameter of 0.380 inches at the locking ridge and a nominal diameter of 0.360 inches. This system also has a minimum height between the top of the coupler to the bone of 0.534 inches. While not significantly smaller than the minimum height of the previous system, this minimum height can be consistently achieved, because the screw can be inserted until fully seated against the bone.

Finally, the second described system (illustrated by the left view of FIG. 17) has a diameter of 0.396 inches and a minimum distance from the top of the coupler to the bone of only 0.369 inches. Again, this minimum height can be consistently achieved as the screw can be inserted until it is fully seated against the bone.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A coupling assembly capable of providing rigid fixed attachment between a pedicle screw fully seated to underlying bone and a member extending between adjacent pedicle screws, the coupling assembly comprising:
    a pedicle screw comprising:
        a threaded shaft; and
        a head portion, the head portion comprising:
            a driving feature; and
            a proximally oriented bore having a bore diameter; and
    a member adapted to extend between adjacent pedicle screws, the member comprising:
        a protrusion adapted for insertion into the bore of the pedicle screw, the protrusion having a protrusion diameter that is larger than the bore of the pedicle screw head portion, the protrusion defining a contiguous surface at a point of the protrusion diameter when engaged with the head portion of the pedicle screw.

2. The coupling assembly as recited in claim 1, wherein the bore is cylindrical.

3. The coupling assembly as recited in claim 1, wherein the protrusion comprises a partially spherical surface.

4. The coupling assembly as recited in claim 1, wherein insertion of the protrusion into the bore is possible by an application of force that forces a point of maximum diameter of the protrusion fully within the bore.

5. The coupling assembly as recited in claim 4, wherein full insertion of the protrusion causes a distal surface of the protrusion to contact a distal portion of the bore.

6. The coupling assembly as recited in claim 1, wherein the bore is adapted to receive the protrusion at a variety of insertion angles.

7. The coupling assembly as recited in claim 6, wherein the bore is adapted to receive the protrusion at any angle between an axis of symmetry of the screw and an axis of symmetry of the protrusion of up to thirty degrees.

8. The coupling assembly as recited in claim 1, wherein the member further comprises an anvil opposite the protrusion, the anvil comprising a partially spherical surface adapted to receive an insertion force to force the protrusion into the bore.

9. The coupling assembly as recited in claim 1, wherein the head portion comprises an annular ridge on an outer surface of the head portion.

10. The coupling assembly as recited in claim 1, wherein when the protrusion is received within the proximally oriented bore, a press fit is created between the protrusion and the head portion.

11. A coupling assembly capable of providing rigid fixed attachment between a pedicle screw fully seated to underlying bone and a member extending between adjacent pedicle screws, the coupling assembly comprising:
    a pedicle screw comprising:
        a threaded shaft; and
        a head portion, the head portion comprising:
            a driving feature;
            an external bore-engaging surface defining an external diameter of the head portion; and
            a proximally oriented screw bore having a proximal portion defining a proximally oriented generally circular opening with a first, narrower diameter and a medial portion with a second, broader diameter; and
    a member adapted to extend between adjacent pedicle screws, the member comprising:
        a female member comprising a receiving bore adapted to receive the head portion of the pedicle screw therein, the receiving bore having an inner diameter that is smaller than the external diameter of the pedicle screw head portion.

12. The coupling assembly as recited in claim 11, wherein the external bore-engaging surface is partially spherical.

13. The coupling assembly as recited in claim 11, wherein the proximally oriented screw bore defines a partially spherical surface.

14. The coupling assembly as recited in claim 13, wherein the diameter of the proximal portion is smaller than a diameter of the partially spherical surface.

15. The coupling assembly as recited in claim 11, wherein the receiving bore is cylindrical.

16. The coupling assembly as recited in claim 11, wherein the female member further comprises an access bore extending through the female member from a terminal end of the receiving bore.

17. The coupling assembly as recited in claim 11, wherein the screw bore is adapted to receive an engaging tip of a tool adapted to apply an engaging force between the head portion and the female member.

18. The coupling assembly as recited in claim 11, wherein when the head portion of the pedicle screw is disposed within the receiving bore, a press fit is created between the head portion and the receiving bore.

19. The coupling assembly as recited in claim 11, further comprising a partially spherical tip disposed within the proximally oriented screw bore.

20. The coupling assembly as recited in claim 19, further comprising an expansion pin disposed within the partially spherical tip.

* * * * *